United States Patent
Ferry et al.

(10) Patent No.: US 8,572,501 B2
(45) Date of Patent: Oct. 29, 2013

(54) RENDERING GRAPHICAL OBJECTS BASED ON CONTEXT

(75) Inventors: Ken Ferry, Los Altos, CA (US); David Andrew McLeod, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 837 days.

(21) Appl. No.: 12/135,942

(22) Filed: Jun. 9, 2008

(65) Prior Publication Data
US 2008/0307341 A1 Dec. 11, 2008

Related U.S. Application Data

(60) Provisional application No. 60/943,035, filed on Jun. 8, 2007.

(51) Int. Cl.
*G06F 3/048* (2013.01)

(52) U.S. Cl.
USPC .......................................... 715/764

(58) Field of Classification Search
USPC .......................................... 715/764
See application file for complete search history.

(56) References Cited

U.S. PATENT DOCUMENTS

| | | | | |
|---|---|---|---|---|
| 6,918,091 B2 * | 7/2005 | Leavitt et al. | ................ | 715/765 |
| 7,298,364 B2 * | 11/2007 | Matsuda | ....................... | 345/173 |
| 7,320,109 B1 * | 1/2008 | Zeevi et al. | ................... | 715/763 |
| 7,602,402 B2 * | 10/2009 | Chuang | ........................ | 345/589 |
| 2003/0160824 A1 * | 8/2003 | Szumla | ........................ | 345/769 |
| 2005/0149303 A1 * | 7/2005 | Agrawala et al. | ................ | 703/2 |
| 2006/0224962 A1 * | 10/2006 | Ostojic et al. | ................. | 715/716 |
| 2008/0007567 A1 * | 1/2008 | Clatworthy et al. | .......... | 345/619 |

* cited by examiner

*Primary Examiner* — Boris Pesin
*Assistant Examiner* — Angie Badawi
(74) *Attorney, Agent, or Firm* — Blakely, Sokoloff, Taylor & Zafman LLP

(57) ABSTRACT

Methods, systems, and apparatus, including computer program products and computer readable media, for rendering graphical objects. A context of a user interface element in a graphical user interface is identified. The identified context is mapped to one or more effects. A graphical object associated with the user interface element is rendered using the effects.

21 Claims, 7 Drawing Sheets

US 8,572,501 B2

RENDERING GRAPHICAL OBJECTS BASED ON CONTEXT

RELATED APPLICATIONS

This application claims the benefit under 35 U.S.C. §119 of U.S. Provisional Application No. 60/943,035, titled "Rendering Graphical Objects Based on Context," filed Jun. 8, 2007, which is incorporated by reference herein in its entirety.

BACKGROUND

This specification relates generally to graphical user interfaces.

A graphical user interface generally includes multiple user interface elements that represent components of the interface. An icon is a particular user interface element whose appearance is defined by a bitmap or image. When the icon is rendered, the appearance of the icon is rendered as specified in an image such as a bitmap or sequence of vector graphic primitives. Whenever the appearance of an icon, (e.g., the color of the icon) needs to be adjusted, the image associated with the icon is often edited as well, which can be a time consuming process.

SUMMARY

In general, one aspect of the subject matter described in this specification can be embodied in methods that include the actions of identifying a context of a user interface element in a graphical user interface, mapping the identified context to one or more effects, and rendering a graphical object associated with the user interface element using the effects. Other embodiments of this aspect include corresponding systems, apparatus, computer program products, and computer readable media.

Particular embodiments of the subject matter described in this specification can be implemented to realize one or more of the following advantages. The shape of a graphical object can be defined once in a graphical object template, and the appearance of the graphical object can be manipulated by adjusting mappings that describe how the template appears given a particular context in which the template is used. Depending on the context, a single template can have many appearances. The appearance of multiple usages of a graphical object template in a graphical user interface can be adjusted simultaneously by changing the mapping. All appearances based on the same graphical object template can be adjusted by updating the template.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
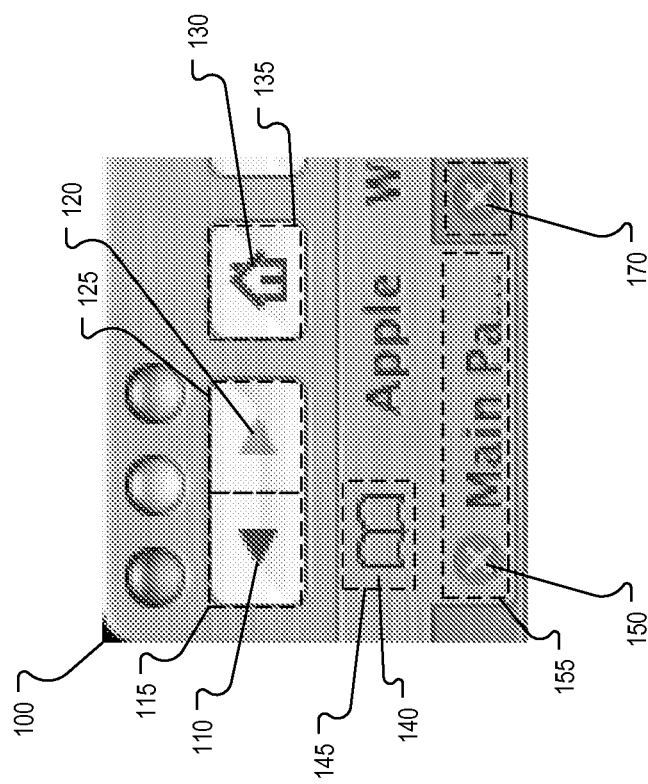
FIG. 1A is a screenshot of a rendered graphical objects in a graphical user interface.

FIG. 1A is a screenshot 100 of rendered graphical object templates (e.g., rendered graphical object templates 110, 120, 130, 140, 150 and 170) in a graphical user interface. Hereafter rendered graphical object templates are referred to as rendered templates. The screenshot 100 depicts the appearance of a small portion of a complete graphical user interface that a user can use to control and manage applications in an environment such as the Mac OS X® operating system from Apple Inc. of Cupertino, Calif. or the Microsoft Windows® operating system from Microsoft Corporation of Redmond, Wash.

Although the screenshot 100 is just a small portion, the screenshot 100 depicts numerous rendered templates that are each rendered in association with various types of user interface elements (e.g., buttons, menus, toolbars, tabs, title bars, status bars, tree views, radio buttons, dropdowns, scrollbars, etc.). In some implementations, a rendered template can be referred to as an icon. For example, the rendered template 110 is rendered in association with the button 115. Similarly, rendered template 140 is rendered in association with a toolbar hotspot 145. The rendered template 150 is rendered in association with a tab 155. A rendered template can be used to effectively decorate a plain user interface element that would otherwise be indistinguishable from other user interface elements of the same type. For example, the rendered templates 110, 120 and 130 distinguish their respective associated buttons 115, 125 and 135.

Graphical object templates, or simply templates, can be associated with a user interface element. The user interface element can be associated with a context that describes how a template that is associated with the element is to be rendered. The context describes information about the template and the associated user interface element. Among other things, the context describes which of many potential states a user interface element is in. For example, the button 115 is in an 'active' state (e.g., the button can be operated by a user). In contrast, the button 125 is in an 'inactive' state. The context can also describe which of multiple styles are associated with the user interface element. A style describes how a user interface element and its graphical object template should generally appear in the user interface. For example, the tab 155 can be associated with a 'light' or a 'raised' style—indicating that the associated tab and its associated template should be drawn to appear bright or raised, respectively, compared to the surface on which the graphical object template is rendered. As another example, the tab associated with the graphical object 170 can be associated with a 'lowered' or a 'dark' style—indicating that this tab and its associated template should be drawn to appear darker or lower, respectively, compared to the surface on which the graphical object template is rendered. Over time the graphical user interface is generally interacted with by a user and affected by application state changes. As such changes occur the context associated with a user interface element can change.

Figure 1C:
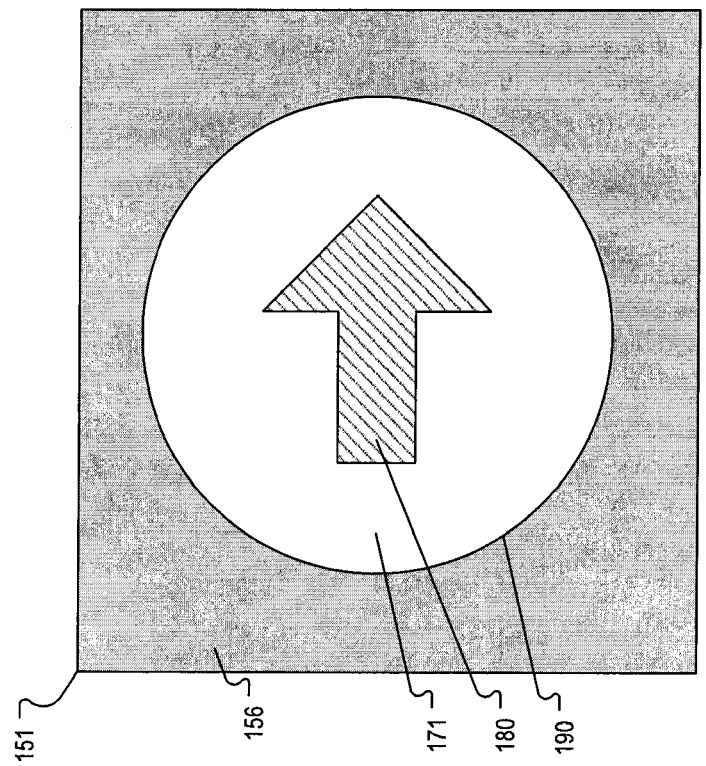
FIGS. 1B and 1C are diagrams of two example graphical object templates.
Figure 1B:
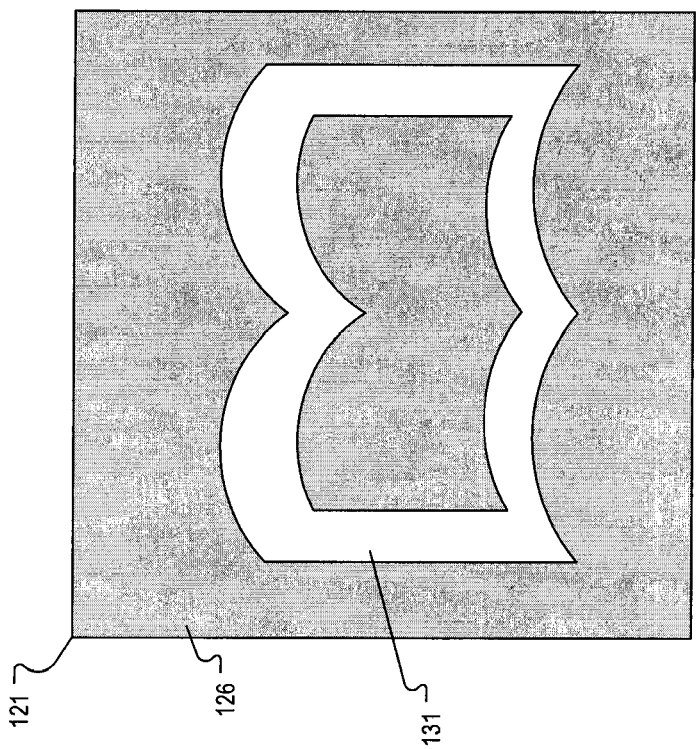

FIGS. 1B and 1C are diagrams of two example graphical object templates 121 and 151. When a graphical object template is rendered, the precise appearance of the rendered template is based on the context associated with the user interface element.

Generally, a graphical object template can be any graphical object (e.g., a bitmap or a series of vector objects). In some implementations, the graphical object template can include two general areas, a background area 126 and a foreground area 131. The background 126 area has no appearance when the graphical object template is rendered (e.g., the background area of the rendered template will be transparent). When a template is rendered by a system, the system renders the template based on a template effect. Thus, particular rendered templates or icons can be generated from rendering a template. The appearance of the rendered template is as if the template was subjected to the specified template effect. Thus if the template effect is a blur effect, then a rendering of a template using the blur effect appears like a blurry rendering of the template. If another template effect is a pixelation effect, then a rendering of the same template appears like a pixelated rendering of the template. A template effect can be any of multiple image transformations including, for example, recolorization, tinting, shadow effects, glow effects, embossing, engraving, dimming and others. Template effects are described in further detail in reference to FIG. 3.

In some implementations, a graphical object template can be specified as a bitmap image where white pixels designate background areas and black pixels designate foreground areas. A recolorization effect can be used such that when the graphical object template is rendered, the black pixels are rendered as yellow pixels. Thus, the rendered template will appear the same as the template except that black pixels specified in the template will appear yellow in the rendered template. In some implementations, any one particular color can be used to designate foreground areas while another distinct color can be used to designate background areas of the template.

In some implementations, the template can include pixels of a color other than the designated foreground and background colors. For example, the graphical object template 151 includes an area 156 having pixels of the designed background color, an area 171 having pixels of the designated foreground color as well as pixels of another color in area 180. The pixels in area 180 have a color that is distinct from the designated foreground (and background) color. In some implementations, when the template 151 is rendered, a template effect can be used to affect the appearance of pixels that are not in the background area 156 (e.g., affecting the pixels in both the area 171 and area 180). Another template effect can be used to affect the appearance of only pixels designated as foreground (e.g., the foreground area 171), without affecting other pixels (e.g., pixels in the area 180). In some implementations, any conventional image or graphical object can be used as a graphical object template. In such implementations, any areas of the conventional image or graphical object that are of the designated background color can be rendered as though they are background areas, while any areas of the designated foreground color can be rendered as though they are foreground areas.

In some implementations, the graphical object template can include transparency or opacity values used to designate portions of the graphical object template as transparent or semi-transparent. For example, each pixel in a graphical object template bitmap can be associated with an alpha value indicating the degree to which the pixel is transparent. When rendered into a rendered template, a semi-transparent pixel in the graphical object template is blended with the appearance of the user interface element on which the graphical object template is being rendered. In such implementations, background areas can be designed using transparency values alone, without using a particular designated color to specify foreground areas.

In some implementations, a graphical object template can be associated with a height-map for specifying a height of the foreground area. For example, the edge 190 of the foreground area 171 can be associated with a height that is lower than another point in the foreground area 171.

Figure 2:
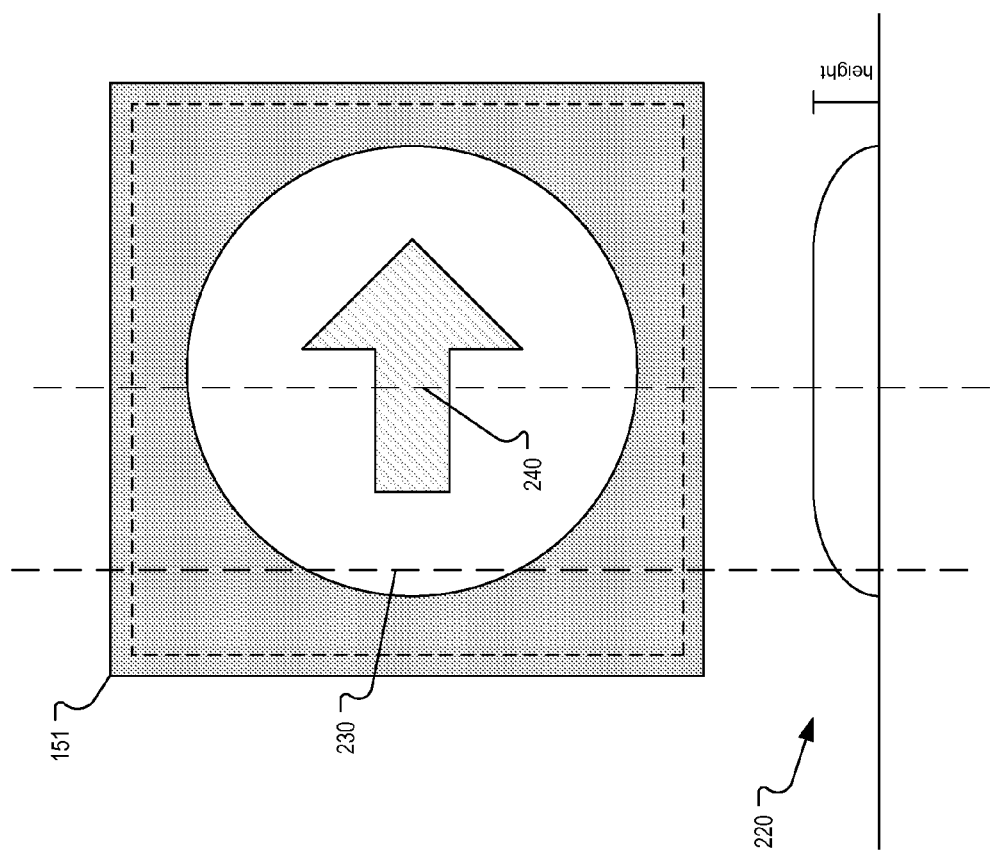
FIG. 2 is a diagram of an example height map associated with a graphical object template.

FIG. 2 is a diagram 220 of an example height-map associated with a graphical object template 151. The diagram 220 shows the height-map of the graphical object template 151 as if the graphical object template 151 were viewed in profile (e.g., from the side, instead of top-down). As shown, at a point 230 the height of the graphical object template is lower than at a point 240. In some implementations, the height-map of a graphical object template can be used by a template effect when rendering the graphical object template into a rendered icon. In some implementations, the height-map can be used to imbue a three dimensional appearance on an otherwise two dimensional graphical object template. For example, the graphical object template can be rendered into an icon using a 'shaded material' image filter, such as the 'CIShadedMaterial' stylize image filter provided by the Core Image Framework, a part of the Mac OS X® operating system.

Figure 3:
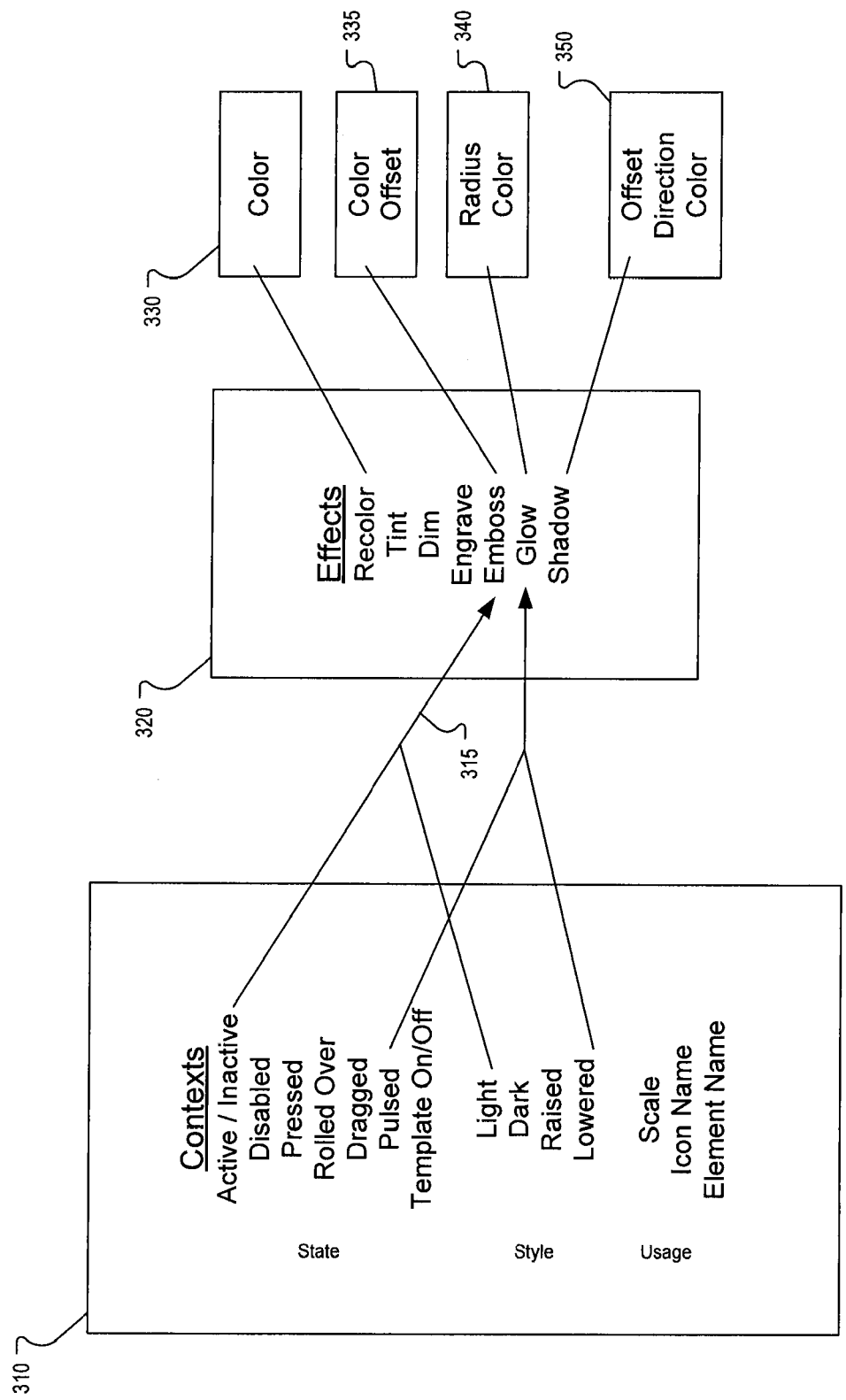
FIG. 3 is a diagram of a mapping from graphical object-contexts to graphical object-effects.

FIG. 3 is a diagram of a mapping from contexts 310 to template effects 320. Given a particular context 310, the mapping describes particular template effects 320 that are to be applied to a template. Collectively the mappings can be considered a rule set governing how templates are rendered in particular contexts. Each mapping can be associated with a particular context. The context can be used to identify a particular mapping to determine what particular one or more effects should be used when rendering a template. For example, consider when the template, associated with the toolbar hotspot 145 in FIG. 1, is rendered. The context associated with the toolbar hotspot 145 indicates the 'light' style and the 'active' state. This particular context ('light' and 'active') maps 315 to an emboss effect. The mapping can also specify values for attributes of the specified template effect 320. For example, the emboss effect is associated with the attributes 335, a color attribute and a depth attribute. The color attribute specifies the color of the embossing edge and the offset attribute specifies the degree to which the graphical object template is offset during a first rendering (e.g., the embossing effect can be achieved by first rendering the graphical object template at the given offset in the given color and then a second rendering of the graphical object template to partially occlude the first rendering).

In some implementations, rather than specifying particular appearances of a graphical object on a usage-by-usage basis, the appearance of a template can be determined by the mappings. For example, for a particular user interface element and template, one can consider the desired appearance of the template depending on particular states of the user interface element. A user may prefer that, for example, when an element is disabled the associated rendered template appears grey; when the element is pressed, the rendered template appears embossed; and when the user interface object is active, the rendered template appears green. Instead of associating the user interface element with three different graphical objects all slightly different in color but otherwise appearing the same, the interface element can instead be associated with a graphical object template. The appearance of a rendered icon generated from a graphical object template is determined by mappings. For example, a mapping can be used to specify that, when a template associated with the user interface element is rendered and the user interface element is locked, then the template is rendered to appear grey. When the same element is in a 'pressed' state, then the template is rendered to appear embossed.

To change the general shape and appearance of a graphical object, only the graphical object template associated with a user interface element need be changed. The precise appearance of a rendered icon generated from the graphical object template is still determined by the mapping. For example, when an 'arrow' graphical object template is changed to an 'open book' graphical object template for a particular user interface element, then the 'open book' graphical object still appears grey when the element is disabled and still appears green when the element is active, even though no specific 'green open book' graphical object is associated with the user interface element.

A particular mapping can apply to particular templates and particular user interface element combinations or more generally can apply to all or some templates and/or all user interface elements. For example, a mapping can be specified that for templates, when rendered in a 'raised' style on an 'active' user interface element, the templates are to be rendered using the embossed template effect. Thus, the appearance of all templates in the graphical user interface can be changed simultaneously (e.g., by a user or a user interface designer) simply by adjusting the mappings without creating new graphical objects.

A context 310 in the mapping can describe states, styles and usage information for any particular graphical object that is being rendered to the graphical user interface. States and styles can be specified in a series of attributes that have a particular value (e.g., a numerical or boolean value). In some implementations, state attributes indicate whether a user interface element is active or inactive (e.g., has focus), disabled (e.g., inoperable to user input), pressed (e.g., a user has clicked down on an element, but has not clicked up), rolled-over (e.g., a mouse cursor partially covers the element), dragged (e.g., the element is being dragged in a drag and drop operation), pulsed (e.g., the element is to be drawn so as to draw the attention of the user) or template-on (e.g., indicating whether a graphical object associated with the element should be drawn as a template). If the context indicates template-off, then a graphical object associated with the user interface element can be rendered as a conventional image. Generally state attributes reflect information about the usage of a graphical object template with respect to a particular user interface element.

Style attributes designate how a user interface element should generally appear as when rendered. In some implementations, a style attribute designates how a surface on which the user interface element is drawn should appear compared to the user interface element. For example, attributes can include: light, dark, raised, or lowered. Other attributes are possible and the name of an attribute need not dictate the precise appearance of an icon generated from a graphical object template rendered in that style. A style attribute can be mapped to one or more effects that achieve the particular style. For example, a mapping can be used to specify that all or some templates associated with the 'light' style are to be rendered in black. Some or all of the style or state attributes can be mutually exclusive. For example, an element cannot both be of a 'raised' style and a 'lowered' style and cannot both be of a 'light' style and a 'dark' style. Generally, style attributes are specified with the user interface element. For example, one user interface element can be associated with a 'trash' template and a 'dark' style, while another user interface element is associated with the same 'trash' template but specify a 'light' style.

In some implementations, a context can include specific usage information. Usage information allows mapping to be directed to specific graphical object templates and user interface elements. In some implementations, usage information can include a scale value indicating a relative size of the appearance of the rendered graphical object. For example, a particular mapping can specify that all or some graphical object templates associated with a scale larger than a specified threshold, are to be rendered into icons using the glow effect while graphical object templates associated with a scale less than the threshold are to be rendered into icons using the recolor effect. The context can include usage information pertaining to the name of a template or user interface element. This usage information can be used to specify mappings that affect particular templates, particular elements or combinations thereof. For example, another mapping can specify that any graphical object associated with the name 'Junk' is to be rendered with a green tint effect.

A mapping can indicate any of one or more of multiple template effects 320. Each template effect determines how a template appears when rendered into an icon. The precise appearance depends on the indicated template effect or combination of template effects. The template effects can have associated attributes which are used to customize the template effect. For example, a mapping can specify a recolor effect that changes the color of areas in the template that are designated as foreground areas. The mapping specifies the color of the recolor template effect as a value of a color attribute 330 associated with the 'recolor' template effect. Similarly, a tint template effect changes the color of all or some areas in the graphical object template, except background areas, by blending the colors in the graphical object template with another color. The other color is specified in a color attribute associated with the tint template effect. A dim template effect changes the appearance of an icon generated from a template by blending the template based on an opacity value (given as an attribute of the template effect). The dim effect can be used to make a graphical object appear lighter, darker and semi transparent. An engrave and emboss template effect can be used to give a rendered template an engraved or embossed appearance, respectively. These template effects can each be associated with attributes 335 specifying the color of the embossing (or engraving) and the offset or depth of the embossing (or engraving). A glow template effect changes the appearance of the rendered template so it appears as though light is shining from behind the rendered template. A glow template effect is associated with attributes 340 specifying a radius or intensity of the glow effect and a color specifying the color of the glow effect (e.g., the color of the light shining behind the graphical object). A shadow template effect is used to render the templates so that a shadow appears to be cast under the icon generated from the template. The shadow template effect is associated with attributes 350 specifying an offset value of the shadow (e.g., how far away the surface that the shadow is being cast over appears to be from the graphical object), a direction of the shadow and a color of the shadow being cast. Similarly, other template effects can also be specified by a mapping. For example, a template effect can correspond to any conventional image manipulation transformation that can be used while rendering a template to an icon (e.g., gradient coloring, blurring, pixelating, sharpening, brightening, shading, distorting, etc.).

In some implementations, a mapping can specify that multiple template effects are used during the rendering of a template into an icon. For example, one mapping can specify that for user interface elements that are in a 'pulsed' state, then an associated template is rendered using a red tint effect and a yellow glow effect. In some implementations, the template effect can be an animated template effect that occurs over time. For example, in one such template effect, the glow around a rendered template can appear to throb or pulse periodically.

Figure 4:
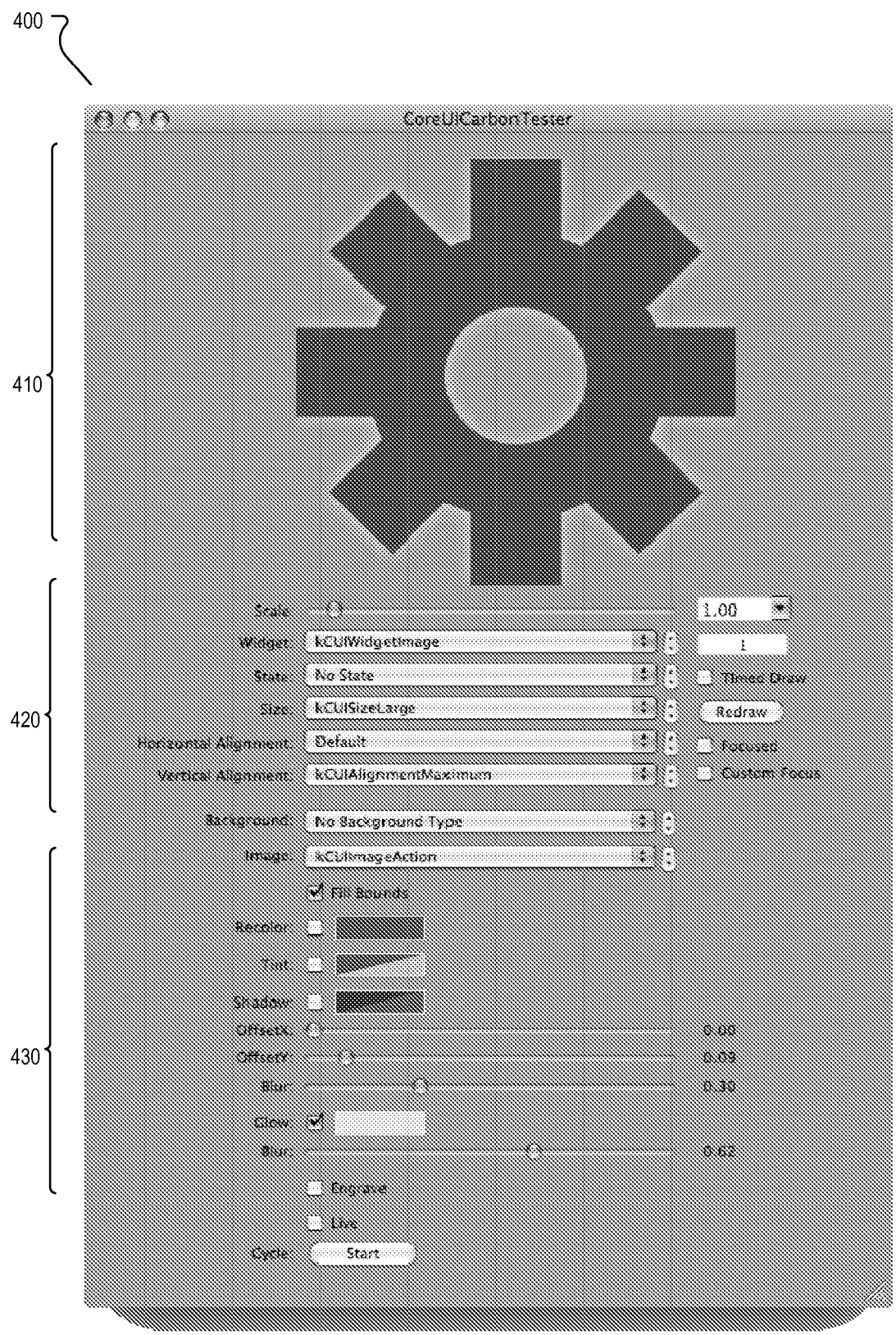
FIG. 4 is a screenshot of dialog previewing mappings.

FIG. 4 is a screenshot of a dialog 400 for previewing mappings. The dialog 400 includes a preview area 410, for viewing a particular graphical object template as rendered given one or more specified template effects. The controls 420 allow a user to affect the configuration of the graphical object template being used to preview template effects. For example, the particular graphical object template being used can be changed, the size of the template in the preview area, the background of the preview area. The controls 430 allow a user to change the template effects being used to render the particular graphical object template in the preview area 410. For example, the controls 430 allow a user to select one or more available template effects and configure each one independently. In response to user input manipulating the controls 430 the preview 410 of the graphical object template is updated so that a user can observe the affect of the template effect on the appearance of the rendered graphical object template.

Figure 5:
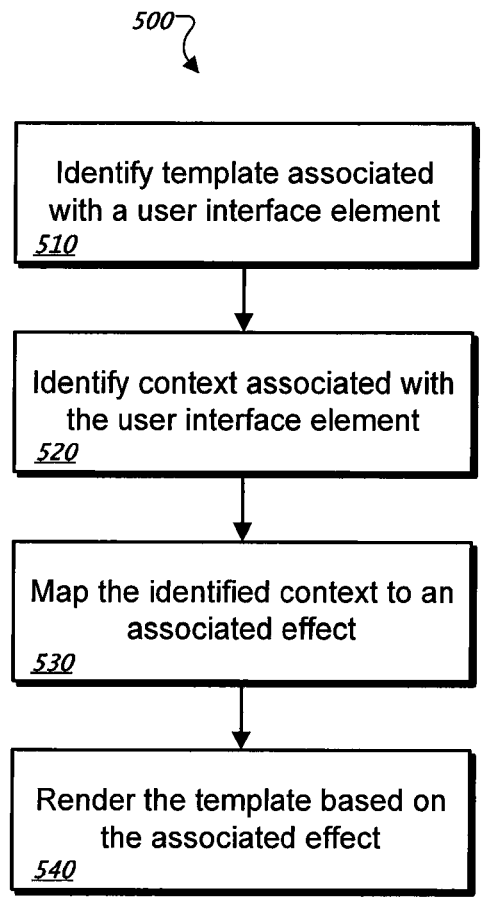
FIG. 5 is a flow diagram of an example process for rendering a graphical object based on the context of the graphical object's usage.

FIG. 5 is flow diagram of an example process 500 for rendering an icon from a template based on the context of the template's usage. For convenience, the process 500 will be described with reference to a system that performs the process 500. The system identifies a graphical object template associated with a user interface element (step 510). In particular, such identification can be made in response to a request to draw the user interface element. The system can identify a context associated with the user interface element (step 520). In particular, the system can identify information associated with the user interface element (e.g., state, style and usage information). The system maps the identified context to an associated template effect (step 530). The system can use mappings (e.g., such as the mapping illustrated in FIG. 3) to identify or more template effects. For example, the system can receive a request to draw a template associated with a particular user interface element. The system identifies the user interface element is both 'disabled' and 'pressed'. Using this information, the system identifies a matching mapping. A corresponding template effect (e.g., grey glow and yellow recolor) is specified by the matching mapping. The template effect while rendering the template to the graphical user interface as an icon (step 540).

Figure 6:
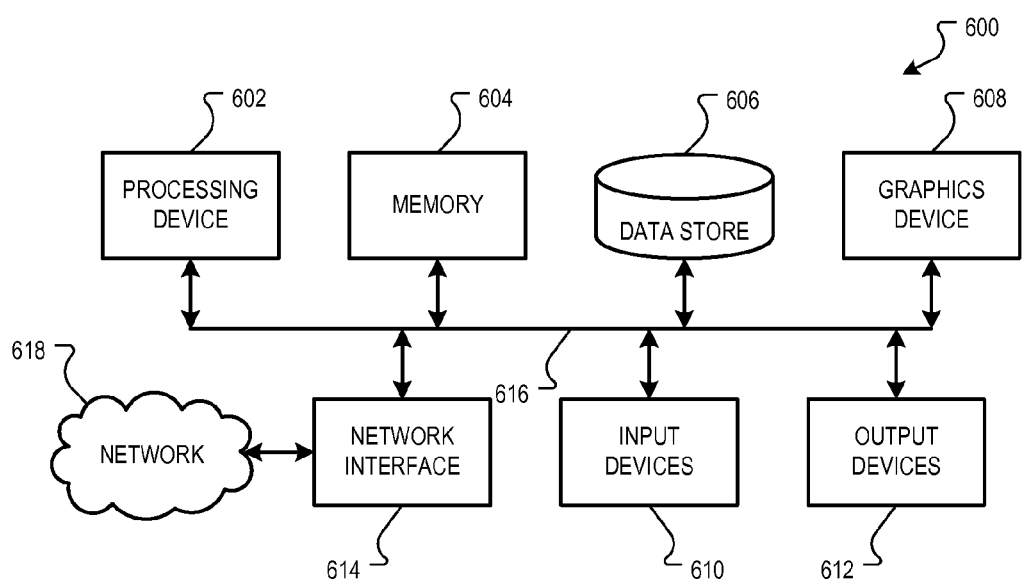
FIG. 6 is an example system for rendering graphical object templates.

FIG. 6 is a block diagram of an example system 600 that can be utilized to implement the systems and methods described herein. The system 600 can, for example, be implemented in a computer device, such as any one of the personal computer devices available from Apple Computer, Inc., or other personal computer devices. Other example implementations can also include video processing devices, multimedia processing devices, portable computing devices, etc.

The example system 600 includes a processing device 602, a first data store 604, a second data store 606, a graphics device 608, input devices 610, output devices 612, and a network device 614. A bus system 616, such as a data bus and a motherboard, can be used to establish and control data communication between the components 602, 604, 606, 608, 610, 612 and 614. Other example system architectures, however, can also be used.

The processing device 602 can, for example, include one or more microprocessors. The first data store 604 can, for example, include a random access memory storage device, such as a dynamic random access memory, or other types of computer-readable medium memory devices. The second data store 606 can, for example, include one or more hard drives, a flash memory, and/or a read only memory, or other types of computer-readable medium memory devices.

The graphics device 608 can, for example, include a video card, a graphics accelerator card, or a display adapter, and is configured to generate and output images to a display device. In some implementations, the graphics device 608 can be realized in a dedicated hardware card connected to the bus system 616. In some other implementations, the graphics device 608 can be realized in a graphics controller integrated into a chipset of the bus system 616. Other implementations can also be used.

Example input devices 610 can include a keyboard, a mouse, a stylus, a video camera, etc., and example output devices 612 can include a display device, an audio device, etc.

The network interface 614 can, for example, include a wired or wireless network device operable to communicate data to and from a network 618. The network 618 can include one or more local area networks (LANs) or a wide area network (WAN), such as the Internet.

In some implementations, the system 600 includes instructions defining an operating system stored in the first data store 604 and/or the second data store 606. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 600 includes a graphical user interface that provides the user access to the various system objects and conveys information about the system 600 to the user in an intuitive manner.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a plurality of contexts of a user interface element in a graphical user interface, wherein the contexts describe one or more of a state, style, or usage of the user interface element, and wherein the user interface element is associated with a graphical object template;
   mapping the identified contexts to one or more graphical object template effects of a plurality of distinct graphical object template effects, each graphical object template effect specifying values for one or more attributes of the graphical object template, wherein the mapping is based on a combination of the identified contexts; and
   rendering the graphical object template into an icon, wherein the icon appearance depends on a combination of the mapped to graphical object template effects.

2. The method of claim 1, where rendering further comprises:
   applying the one or more graphical object template effects to the graphical object template.

3. The method of claim 2, wherein the graphical object template comprises a background area and a foreground area.

4. The method of claim 3, wherein the graphical object template comprises pixels in a first color designating the background area and pixels in a second color designating the foreground area.

5. The method of claim 4, wherein applying the effects to the graphical object template comprises rendering the pixels designating the background area in a color different from the first color.

6. The method of claim 4, wherein applying the effects to the graphical object template comprises rendering the pixels designating the foreground area in a color different from the second color.

7. The method of claim 2, wherein the graphical object template comprises one or more transparency values.

8. The method of claim 7, wherein applying the one or more graphical object template effects to the graphical object template comprises blending pixels of the graphical object template with an appearance of the user interface element in accordance with the transparency values.

9. The method of claim 2, wherein the graphical object template is associated with a height map.

10. The method of claim 9, wherein applying the effects to the graphical object template comprises rendering the graphical object template with a multi-dimensional appearance based on the height map.

11. The method of claim 2, further comprising, before the mapping, identifying the graphical object template in response to a request to draw the user interface element.

12. The method of claim 1, wherein identifying the plurality of contexts of the user interface element comprises identifying a state attribute of the user interface element.

13. The method of claim 12, wherein the state attribute comprises active, inactive, disabled, pressed, rolled-over, dragged, pulsed, template-on, or template-off.

14. The method of claim 1, wherein identifying the plurality of contexts of the user interface element comprises identifying a style attribute of the user interface element.

15. The method of claim 14, wherein the style attribute comprises a light attribute or a dark attribute.

16. The method of claim 14, wherein the style attribute comprises a raised attribute or a lowered attribute.

17. The method of claim 1, wherein identifying the plurality of contexts of the user interface element comprises identifying usage information of the user interface element.

18. The method of claim 17, wherein the usage information comprises one or more of a scale value, a name of a template, or a name of a user interface element.

19. A system, comprising:
memory;
one or more processors; and
instructions stored in the memory and configured for execution by the one or more processors, the instructions comprising instructions to:
  identify a plurality of contexts of a user interface element in a graphical user interface, wherein the contexts describe one or more of a state, style, or usage of the user interface element, and wherein the user interface element is associated with a graphical object template;
  map the identified contexts to one or more graphical object template effects of a plurality of distinct graphical object template effects, each graphical object template effect specifying values for one or more attributes of the graphical object template, wherein the mapping is based on a combination of the identified contexts; and
  render the graphical object template into an icon, wherein the icon appearance depends on a combination of the mapped to graphical object template effects.

20. A computer program product, encoded on a non-transitory computer-readable medium, operable to cause a data processing apparatus to perform operations comprising:
  identifying a plurality of contexts of a user interface element in a graphical user interface, wherein the contexts describe one or more of a state, style, or usage of the user interface element, and wherein the user interface element is associated with a graphical object template;
  mapping the identified contexts to one or more graphical object template effects of a plurality of distinct graphical object template effects, each graphical object template effect specifying values for one or more attributes of the graphical object template, wherein the mapping is based on a combination of the identified contexts; and
  rendering the graphical object template into an icon, wherein the icon appearance depends on a combination of the mapped to graphical object template effects.

21. The method of claim 1, wherein the mapped to graphical object template effects apply only to a portion of the graphical object template.

* * * * *